Figure 1:
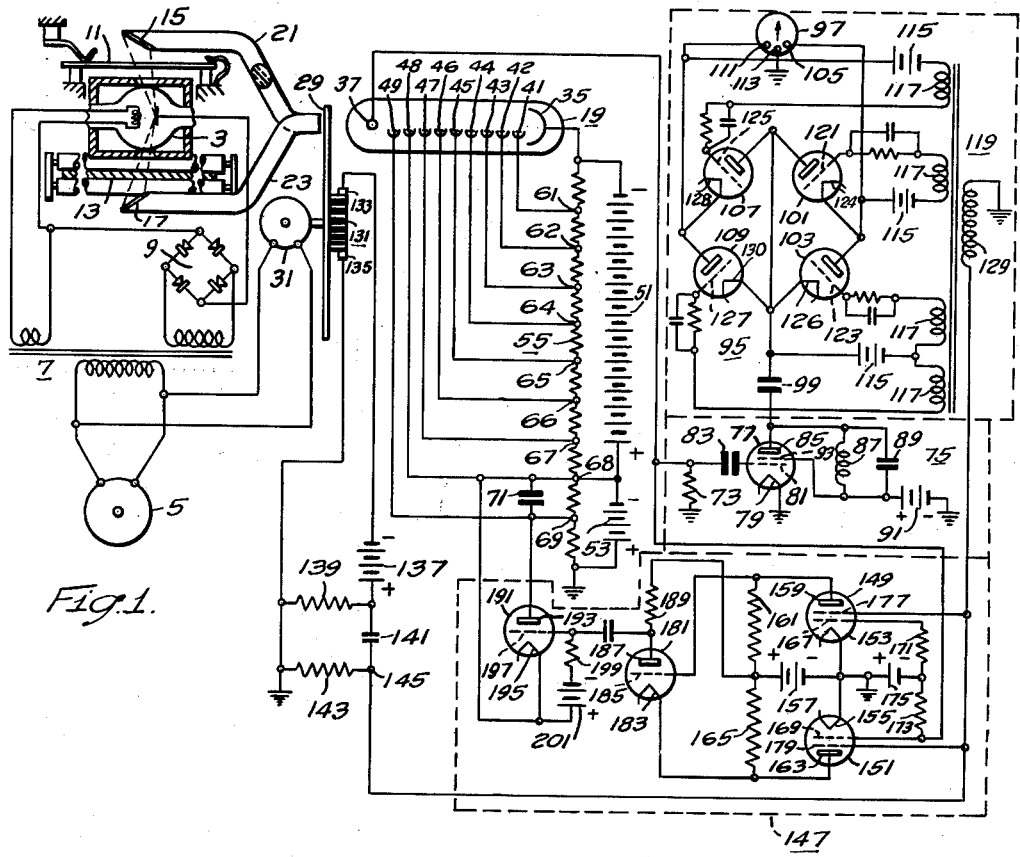

Jan. 22, 1952 W. ALTAR ET AL 2,583,132
INSPECTION APPARATUS
Filed March 27, 1947

WITNESSES:
E.G. M?Closkey
John R. Shipman

INVENTORS
William Altar and
Otto J. M. Smith.
BY
Hymen Diamond.
ATTORNEY

Patented Jan. 22, 1952

2,583,132

UNITED STATES PATENT OFFICE 2,583,132

INSPECTION APPARATUS

William Altar, Pittsburgh, and Otto J. M. Smith, Scranton, Pa., assignors to Westinghouse Electric Corporation, East Pittsburgh, Pa., a corporation of Pennsylvania Application March 27, 1947, Serial No. 737,606

4 Claims. (Cl. 250—83.3)

This invention relates to apparatus for inspecting articles and more particularly to apparatus for inspecting and comparing two articles by the X-ray absorption method.

It is well known that the absorption of monochromatic X-rays by a homogeneous material varies with the thickness of the material. The amount of absorption for a material of a given thickness depends upon the particular material used and the wave length of the X-rays. Consequently, it is possible to compare two articles by measuring the amount of X-ray absorption by the articles.

Comparison of two articles by measuring the X-ray absorption thereof may be usefully applied in a number of ways, such as in a thickness gauge for homogeneous materials. For example, it is desirable in connection with the rolling operations of a steel mill to measure the thickness of a substantially homogeneous steel strip without physical contact with the strip. The strip is moving at a very high speed, and an indication of the thickness as compared to a standard thickness is desired to permit correction and control of the rolling apparatus. To be useful, such an indication must, therefore, be given very quickly and accurately.

One of the familiar ways of measuring X-ray absorption is by means of a photographic film exposed to the X-rays after passage thereof through the material. Such an arrangement requires too much time to obtain the desired indication where rapid results are necessary as in a thickness gauge for a steel mill.

More recently, consideration has been given to the use of a photoelectric tube exposed to light from a fluorescent screen subjected to the X-rays after their passage through the material to be examined. However, prior arrangements in comparison apparatus employing photoelectric tubes have not been entirely satisfactory for several reasons. Among these are the difficulties arising from voltage fluctuations at the target of the X-ray tube, and from the instability of the photoelectric tube and its associated circuits.

It is accordingly an object of our invention to provide new and improved apparatus for comparing two articles by the X-ray absorption method.

A further object of our invention is to provide novel apparatus employing a photoelectric tube for comparing two articles by the X-ray absorption method.

Another object of our invention is to provide new and improved apparatus for comparing the intensity of light from two different sources.

A still further object of our invention is to provide new and improved apparatus including photoelectric means for comparing the intensity of light from two different sources.

Still another object of our invention is to provide a novel arrangement for improving the stability of a photoelectric tube and its associated circuits.

More specifically, it is an object of our invention to provide novel apparatus employing a photoelectric tube for comparing two articles by the X-ray absorption method in which disturbing effects of voltage fluctuations at the target of the X-ray tube and of instability of the photoelectric tube and its associated circuits are minimized or avoided.

In accordance with our invention, as applied to comparison apparatus, X-rays from a single source are projected through the two articles to be compared. A fluorescent screen is associated with each article to receive the X-rays after passage thereof through the corresponding article. Light from the two screens is projected into a single photoelectric tube periodically but in opposite phase relation. Thus, if the energization of the photoelectric tube by the two light beams is unequal, an alternating output is obtained from the tube, the amplitude of which is a measure of the difference in X-ray absorption by the two articles. The alternating output of the photoelectric tube may be amplified by an alternating-current amplifier and eventually applied to an indicating device, such as a meter or relay.

Since the intensities of the X-rays through both articles change only in constant proportions under voltage or current fluctuations in the single X-ray tube, the relative responses in the output of the single photoelectric tube for the two articles is not affected substantially by such fluctuations. Moreover, the effect of variations in the sensitivity of the photoelectric tube are reduced since such variations would affect both responses equally.

To obtain complete compensation for variations in the sensitivity of the photoelectric tube, as may be brought on by fatigue, a compensating circuit may be provided. This compensating circuit, in effect, compares the total voltage output of the photoelectric tube with a standard and varies the voltage supplied to the photoelectric tube in accordance therewith, thereby compensating for variations in tube sensitivity.

Figure 2:
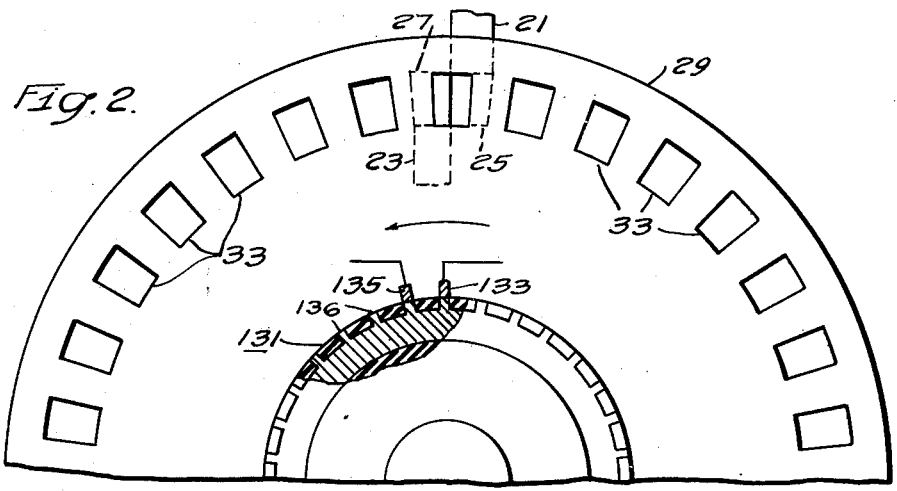

The features of our invention, which we consider novel, are set forth with more particularity in the accompanying claims. The invention itself, however, together with additional objects and advantages thereof may be better understood from the following description of specific apparatus embodying the invention as read with reference to the accompanying drawing, in which:

Figure 1 is a schematic diagram of a preferred embodiment of our invention, as applied to a thickness gauge, and Fig. 2 is an enlarged partial view of an apertured disc employed in the apparatus of Fig. 1.

As shown in Fig. 1, X-rays are generated by means of an X-ray tube 3 energized from a source of alternating current 5 through a transformer 7 and the usual full wave rectifier 9. The X-ray tube 3 is positioned substantially midway between a metal strip 11 of a standard thickness hereinafter referred to as the standard strip, and a metal strip 13 of the same material of an unknown thickness hereinafter referred to as the test strip. The arrangement illustrated corresponds to a thickness gauge, as applied to a rolling mill in which the standard sheet 11 is held in a fixed position while the test strip 13 is moved rapidly past the X-ray tube in a direction perpendicular to the plane of the drawing. The X-ray tube 3 is adapted to direct substantially the same quantity of X-rays onto each of the strips 11 and 13.

A fluorescent screen 15 is positioned on the opposite side of the standard strip 11 from the X-ray tube 3 and is arranged to receive X-rays after passage thereof through the standard strip. The screen 15 is of a suitable material, such as silver activated zinc sulphide or calcium tungstate, which converts incident X-radiation into light of a proportional intensity.

A similar screen 17 of the same material and size is positioned on the opposite side of the test strip 13 from the X-ray tube 3 in the same relative position as the first screen 15 bears to the standard strip 11. Screen 17 is arranged to receive X-rays after passage thereof through the test strip 13.

The light from the two screens 15 and 17 is to be projected onto a single photoelectric tube 19 periodically but in substantially opposite phase relation. This may be accomplished by any one of several suitable arrangements. We prefer to have each screen 15 and 17 in the form of a coating on the end of a rod 21 and 23, respectively, of transparent thermoplastic resin, such as the resin known as Lucite, which is capable of conducting light lengthwise thereof with but a small loss of light in other directions. The two light conducting rods 21 and 23 are shaped and positioned so that the ends thereof opposite from the screens 15 and 17 are adapted to direct light from the screens toward the light sensitive area of the photoelectric tube 19. The two ends 25 and 27 of the light conducting rods 21 and 23, respectively, opposite from the screens 15 and 17 are positioned side-by-side, as shown in Fig. 2, and have substantially the same cross-sectional area and shape.

Interposed between the ends 25 and 27 of the light conducting rods 21 and 23 and the photoelectric tube 19 is an apertured disc 29. The disc is arranged to be rotated in synchronism with the supply voltage for the X-ray tube 3 by a synchronous motor 31 energized from the alternating-current source 5. A plurality of apertures 33 is provided in the disc 29, the apertures 33 being located so that each aperture is moved in front of the ends of the two rods successively during each revolution of the disc. Preferably, each aperture 33 is the same size and shape as the end of one of the light conducting rods 21 and 23 with the space between adjacent apertures being of just sufficient size to completely cover the end of a rod. It follows that light from one or the other or both of the rods 21 and 23 is always directed onto the photoelectric tube 19 while the disc is rotating. Moreover, the sum of the cross-sectional areas of the ends 25 and 27 of the rods 21 and 23, which are uncovered at any time, remains substantially constant. Therefore, if the light available at the end of the rod 23 associated with the test strip 13 is equal to the light available at the end of the rod 21 associated with the standard strip 11, the light projected onto the photoelectric tube 19 remains substantially constant. On the other hand, if the lights from the two rods 21 and 23 are unequal, an alternating light stimulus is provided for the photoelectric tube 19.

The photoelectric tube 19 is preferably of the secondary emission multiplier type, known as a photomultiplier tube, such as an RCA 931–A tube. The photoelectric tube 19 includes an anode 37 and a cathode 35, as well as nine dynodes 41, 42, 43, 44, 45, 46, 47, 48 and 49 interposed between the cathode 35 and the anode 37 to provide the multiplier effect. Supply voltages for the photoelectric tube 19 are obtained from a pair of series-connected substantially constant direct-current voltage sources 51 and 53. A voltage divider 55 is connected across the series-connected voltage sources 51 and 53 with its positive terminal connected to ground and its negative terminal connected to the cathode 35 of the photoelectric tube 19. Intermediate taps 61, 62, 63, 64, 65, 66, 67, 68 and 69 are provided on the divider 55 and are spaced therealong between the negative and positive terminals with the dynodes of the photoelectric tube 19 connected to the intermediate taps in their order of location between the cathode 35 and the anode 37, the ninth dynode 49, which is closest to the anode 37 and furthest from the cathode 35, being connected to the most positive of the intermediate taps 69 while the first dynode 41, closest to the cathode 35, is connected to the most negative intermediate tap 61. A capacitor 71 is connected between the eighth and ninth dynodes 48 and 49 for purposes which will be more fully explained in connection with the compensation circuit.

The anode 37 of the photoelectric tube 19 is connected through a resistor 73 to the ground. Thus, when light is directed onto the photoelectric tube 19, current flows through the resistor 73 creating a voltage thereacross. When the light is substantially constant, as is provided when the X-ray absorption by each of the two strips 11 and 13 is the same, the voltage across the resistor 73 is substantially constant. However, when the X-ray absorption of the two strips is unequal, an alternating-voltage component appears across the resistor 73.

An alternating-current amplifier 75 is provided to amplify the alternating component which appears across the resistor 73 in the anode circuit of the photoelectric tube 19. The amplifier 75 includes a vacuum tube 77 having a grounded cathode 79 and a control electrode 81 connected through a blocking capacitor 83 to the ungrounded end of the resistor 73. The anode 85 of the amplifier tube 77 is connected through a high-Q resonant circuit, comprising an inductor 87 and a capacitor 89 tuned to the desired frequency, and a substantially constant direct-current voltage source 91 to the ground. The screen grid 93 of the amplifier tube is connected to the junction point between the voltage source 91 and the resonant circuit.

The output of the amplifier 75 is applied to an indicator. In the event a mere indication of the existence of a difference in X-ray absorption of the two strips 11 and 13 is all that is desired, the indicator may be a simple indicating device, such as a meter or relay. However, if it is desired to indicate which of the two strips 11 and 13 has a greater X-ray absorption and the amount of the difference, a more complicated indicator may be provided, as illustrated. This indicator includes an algebraic rectifier 95 connected to the amplifier 75 to convert the output thereof into a direct current of a magnitude which is a measure of the difference in X-ray absorption and a polarity dependent upon which of the strips has the greater absorption. A suitable polarized direct-current meter 97 is provided in the output circuit of the algebraic rectifier.

The algebraic rectifier 95 is connected to the anode 85 of the amplifier tube 77 through a blocking capacitor 99. The algebraic rectifier includes two pairs of vacuum tubes, one pair of vacuum tubes 101 and 103 being inversely connected between the blocking capacitor 99 and one end terminal 105 of the meter 97 while the other pair of vacuum tubes 107 and 109 is inversely connected between the blocking capacitor 99 and the other end terminal 111 of the meter 97. The center terminal 113 of the meter 97 is connected to ground.

The control circuit of each of the vacuum tubes 101, 103, 107, 109 includes a biasing voltage source 115 and an individual secondary winding 117 of a transformer 119. The arrangement is such that a voltage pulse of one polarity supplied through the transformer 119 causes the control grids 121 and 123 of both tubes 101 and 103 of one pair to become positive with respect to their cathodes 124 and 126, while a voltage pulse of opposite polarity supplied through the transformer 119 causes the control grids 125 and 127 of the other pair of vacuum tubes 107 and 109 to become positive with respect to their cathodes 128 and 130.

It is apparent that the alternating-voltage component across the resistor 73 in the anode circuit of the photoelectric tube 19, when the standard strip 11 has a greater absorption than the test strip 13, is approximately 180° out of phase with the alternating-voltage component when the absorption of the standard strip 11 is less than that of the test strip 13. It follows that at any given instant of time, other than one in which the alternating component is zero, the terminal of the algebraic rectifier 95 connected to the blocking capacitor 99 is positive with respect to the ground if a particular one of the strips has the greater absorption but is negative with respect to ground if that one particular strip does not have the greater absorption. Then, if the terminal connected to the blocking capacitor is positive with respect to ground at the instant the right-hand pair of tubes 101 and 103 in the algebraic rectifier have positive control grids, current flows through the upper tube 101 of the pair and through the meter 97 to ground. If the control grids of the left-hand pair 107 and 109 are then made positive in the next half period of the alternating component, the terminal of the algebraic rectifier connected to the blocking condenser 99 becomes negative with respect to ground and current flows from ground through the meter 97 and the lower tube 109 of the left-hand pair. As a result, the current through the meter 97 is in the same direction in both half periods of the alternating component to cause the indicating arm of the meter to move in one direction from its zero position. The extent of movement of the indicating arm depends upon the magnitude of the current in the meter 97 and is a measure of the difference in X-ray absorption.

If, at the instant the control grids of the right-hand pair of tubes 101 and 103 in the algebraic rectifier 95 are positive, the terminal connected to the blocking capacitor 99 is negative with respect to ground, current flows from the ground through the meter 97 and the lower tube 103 of the pair. Similarly, if the grids of the left-hand pair 107 and 109 are made positive during the next half period of the alternating component, current flows from the terminal connected to the blocking capacitor 99 through the upper tube 107 of the pair and the meter 97 to be grounded. As the result, the indicating arm of the meter 97 is moved from its zero position in the opposite direction from that in the situation previously described.

The primary winding 129 of the transformer 119 supplying the control circuits of the vacuum tubes 101, 103, 107 and 109 in the algebraic rectifier 95 is connected to be energized at intervals determined by a suitable phasing apparatus. We prefer to control the phasing operation by means of a commutator 131 mounted on the rotating disc 29. A pair of brushes 133 and 135 engage the surface of the commutator 131 and, as shown in Fig. 2, are positioned to be electrically interconnected by the commutator just slightly prior to the time at which the end 25 of the light conducting rod 21 associated with the standard strip 11 is completely uncovered. It is to be noted that the angular brush width and the width of each conducting segment 136 on the commutator is one-half the angular width of an aperture. Then, the disc must move angularly an amount equal to two widths of a brush between interconnecting and disconnecting the brushes. As a result, the commutator 131 disconnects the brushes 133 and 135 just slightly prior to the time the end 27 of the light conducting rod 23 associated with the test strip 13 is completely uncovered.

Externally, one of the brushes 133 is connected to the negative terminal of a substantially constant direct-current voltage source 137 while the other brush 135 is connected to ground and to the positive terminal of the source 137 through a resistor 139. Thus, an approximately square wave voltage is produced across the resistor 139 as the disc 29 rotates. A capacitor 141 and a second resistor 143 are connected in series with each other and in parallel with the first resistor 139, the capacitor 141 being connected to the junction point between the first resistor 139 and the positive terminal of the voltage source 137. The primary winding 129 of the transformer 119 of the algebraic rectifier is then connected between the ground and the junction point 145 between the capacitor 141 and the second resistor 143. Thus, a series of relatively short pulses of voltage are produced across the second resistor 143 with successive pulses being of opposite polarity. The pulses of one polarity occur each time the brushes 133 and 135 are interconnected by the commutator 131 and each such pulse lasts for a short period during which the end 25 of the rod 21 associated with the standard strip 11 is completely uncovered. The pulses of the other polarity occur each time the brushes 133 and 135 are disconnected by the commutator and each such pulse lasts for a short period during which the end 27 of the rod 23 associated with the test strip 13 is completely uncovered. Since the secondary windings of transformer 119 are wound alike, the control grids of one pair of vacuum tubes of the algebraic rectifier are made positive by pulses of one polarity while the grids of the other pair are made positive by pulses of opposite polarity. The characteristics of the tubes 101, 103, 107 and 109 and the relative voltages are such that the current conducted through one of the tubes when its grid is made positive is approximately proportioned to the magnitude of the anode voltage.

A compensation circuit 147 is also arranged to be operated in phase with the disc 29 through the pulses developed across the second resistor 143 in the commutator circuit. The compensation circuit 147 includes a pair of vacuum tubes 149 and 151, preferably tetrode tubes, the cathodes 153 and 155 of which are connected together to the negative terminal of another substantially constant direct-current voltage source 157 and to ground. The anode 159 of the first tetrode 149 is connected through a resistor 161 to the positive terminal of the voltage source 157. The anode 163 of the second tetrode 151 is also connected to the positive terminal of the voltage source 157 through another resistor 165. The control electrodes 167 and 169 of the two tetrodes 149 and 151, respectively, are connected to the grounded cathodes 153 and 155 thereof through individual resistors 171 and 173, respectively, and a biasing voltage source 175. The control grid 169 of the second tetrode 151 is also connected to the anode 37 of the photoelectric tube 19. The screen grids 177 and 179 of the two tetrodes 149 and 151, which are also employed in controlling conduction therethrough, are connected to the junction point 145 between the capacitor 141 and second resistor 143 in the commutator circuit.

The biasing voltage for the control grids 167 and 169 of the two tetrodes 149 and 151 remains substantially constant and is of sufficient magnitude to prevent the tetrodes from conducting except during a period when a positive voltage pulse is applied to the screen grids 177 and 179. Since the control grid 169 of the second tetrode 151 is connected to the anode 37 of the photoelectric tube 19, the output voltage of the photoelectric tube as appears across resistor 73 is also impressed in the control circuit of the second tetrode. When the commutator 131 causes a voltage pulse making the screen grids 177 and 179 of the tetrodes positive, current flows through both tetrodes. However, because of the negative voltage applied in the control circuit of the second tetrode 151 from the output of the photoelectric tube 19, current through the first tetrode 149 is greater than that through the second tetrode 151. As a result, the anode 159 of the first tetrode 149 is at that time more negative than the anode 163 of the second tetrode 151.

An auxiliary amplifier tube 181 is provided to amplify the difference between the potentials of the anodes 159 and 163 of the two tetrodes 149 and 151. The cathode 183 of the auxiliary tube 181 is connected to the anode 163 of the second tetrode 151 while the control grid 185 is connected to the anode 159 of the first tetrode 149. The anode 187 of the auxiliary tube 181 is connected through a resistor 189 to the positive terminal of the voltage source 157 for the two tetrodes.

Another vacuum tube 191 has its anode 193 connected to the ninth dynode 49 of the photoelectric tube 19 while the cathode 195 of the vacuum tube 191 is connected to the eighth dynode 48. The control grid 197 of the vacuum tube 191 is connected to the anode 187 of the auxiliary tube 181 and is also connected to the cathode 195 of the vacuum tube 191 through a resistor 199 and a biasing voltage source 201.

When the anode 159 of the first tetrode 149 becomes more negative than the anode 163 of the second tetrode 151, the control grid 185 of the auxiliary tube 181 becomes negative with respect to the cathode 183 thereof. This results in a positive voltage pulse on the control grid 197 of the vacuum tube 191, which grid 197 is normally held at a high negative voltage by the biasing voltage source 201. While the grid 197 is negative, tube 191 is nonconductive and the condenser 71 between the eighth and ninth dynodes 48 and 49 is charged from the second voltage supply source 53. However, when the positive voltage pulse appears on the control grid 197, the tube 191 becomes conductive and discharges the condenser 71 to an extent determined by the amplitude of the positive voltage pulse on the grid 197. The amplitude of this pulse, of course, is determined primarily by the magnitude of the output voltage of the photoelectric tube 19.

Since the gain of the photoelectric tube 19 is determined by the voltage between the eighth and ninth dynodes 48 and 49, a discharge of the condenser 71 reduces the gain. In between successive positive pulses from the commutator, the condenser 71 gradually recharges. It is then apparent that the gain of the photoelectric tube 19 is reduced until the output voltage of the photoelectric tube 19 is just sufficient to maintain the voltage of condenser 71 substantially constant. Should the sensitivity of the photoelectric tube 19 vary, such variation is immediately reflected in the output voltage of the photoelectric tube and results in a change in the voltage of the condenser 71 to vary the gain of the photoelectric tube and thereby compensate for the change in sensitivity.

It is to be noted that the voltage pulse from the commutator 131 is phased so that the tetrodes 149 and 151 may conduct only during an interval when the output voltage of the photoelectric tube 19 is substantially the result of energization of the photoelectric tube 19 by light from the rod 21 associated with the standard strip 11. Thus, in effect, the compensation circuit compares the output voltage at that interval with a standard voltage to give an accurate indication of the sensitivity of the photoelectric tube 19.

Although we have shown and described the apertures 33 in the disc 29 as being uniformly spaced to provide a substantially constant quantity of light on the photoelectric tube 19 so long as the absorption of the standard and test strips 11 and 13 are equal, it obviously is not necessary that such an arrangement be employed. Any suitable arrangement in which light from the two rods 21 and 23 is directed onto the photoelectric tube 19 periodically, but in substantially opposite phase relation, is satisfactory.

When the X-ray tube 3 is supplied with a periodically pulsating voltage, as in the arrangement illustrated, it is preferable that the number of apertures 33 in the disc 29 be selected so that the frequency at which light from one of the light conducting rods is directed onto the photoelectric tube is $n$ times the frequency of the supply voltage for the X-ray tube, where $n$ is other than a whole number. Otherwise, the photoelectric tube may be exposed to light from one rod at the same point always on the periodic pulsation of the supply voltage for the X-ray tube and thereby a systematic error may be introduced. Thus, if a 60-cycles per second alternating-voltage source is employed, the pulsating supply voltage on the X-ray tube 3 beats 120 times a second and the frequency of the supply voltage is either 120 cycles per second or 60 cycles per second depending upon whether or not the half periods of the source voltage of opposite polarity are identical. The disc 29 is then to be rotated in synchronism with the source voltage, for example, at the rate of 1800 revolutions per minute. The preferred number of apertures in the disc is then an odd number, for example, 31, in which case the frequency of the light from one rod is 930 exposures per second or 15.5 times 60 cycles per second or 7.75 times 120 cycles per second. In this manner any systematic errors resulting from a systematic variation in the X-ray yield because of the systematic variation in the supply voltage is avoided.

It is also possible by spacing the apertures 33 other than uniformly to change, in effect, the quality of the X-radiation so far as the photoelectric tube response is concerned. For instance, if a certain application requires a narrow X-ray spectrum, the apertures 33 may be arranged in groups so that the photoelectric tube 19 is exposed to light only when the target voltage of the X-ray tube 3 is at or near its positive maximum.

While we have shown and described a specific embodiment of our invention, we are aware that many modifications thereof may be made without departing from the spirit of the invention. It is not our intention therefore to limit our invention to the particular arrangement shown and described.

We claim as our invention:

1. Apparatus for comparing two articles comprising a source of X-rays adapted to project X-rays on to each of said articles individually, a screen associated with each of said articles and positioned to receive X-rays from said source after passage thereof through the corresponding article, said screens being of a material which converts incident X-radiation into light of a proportional intensity, a photoelectric device having an output circuit associated therewith, means for directing light from said screens on to said photoelectric device periodically so that said screens begin to illuminate said photoelectric device alternately, an amplifier connected to said output circuit to amplify an alternating current therein resulting from unequal light from said screens, an algebraic rectifier operated in phase with said light directing means and connected to said amplifier to convert the output thereof to a direct current of a polarity determined by which of the screens provides the greater light, the magnitude of said direct current being a measure of the difference of said lights, and a polarized current responsive device connected to said rectifier to be energized by said direct current.

2. Apparatus for comparing two articles comprising a source of X-rays adapted to be energized from a source of periodically pulsating voltage to project X-rays on to each of said articles individually, a screen associated with each of said articles and positioned to receive X-rays from said source after passage thereof through the corresponding article, said screens being of a material which converts incident X-radiation into light of a proportional intensity, a photoelectric device having an output circuit associated therewith, means for directing light from said screens on to said photoelectric device periodically but in substantially opposite phase relation, an amplifier connected to said output circuit to amplify an alternating current therein resulting from unequal light on said screens, an algebraic rectifier operated in phase with said light directing means and connected to said amplifier to convert the output thereof to a direct current of a polarity determined by which of the screens provides the greater light, the magnitude of said direct current being a measure of the difference of said light, and a polarized current responsive device connected to said rectifier to be energized by said direct current.

3. Apparatus for comparing two articles comprising a source of X-rays adapted to project X-rays onto each of said articles individually, a screen associated with each of said articles and positioned to receive X-rays from said source after passage thereof through the corresponding article, said screens being of a material which converts incident X-radiation into light of a proportional intensity, a photoelectric device having an output circuit associated therewith, circuit means connected to said photoelectric device to provide an output circuit therefor and including means providing a supply voltage, the magnitude of which determines the magnitude of output voltage in said output circuit for a given light on said photoelectric device, and a capacitor circuit responsive to said output voltage to vary the magnitude of said supply voltage to said photoelectric device in such a way as to compensate for fluctuations in the sensitivity of said tube, means for directing light from said screens onto said photoelectric device periodically so that said screens begin to illuminate said photoelectric device, an amplifier connected to said output circuit to amplify an alternating current therein resulting from unequal light from said screens, an algebraic rectifier operated in phase with said light-directing means and connected to said amplifier to convert the output thereof to a direct current of a polarity determined by which of the screens provides the greater light, the magnitude of said direct current being a measure of the difference of said lights, and a polarized current responsive device connected to said rectifier to be energized by said direct current.

4. Apparatus for comparing two articles comprising a source of X-rays adapted to project X-rays onto each of said articles individually, a screen associated with each of said articles and positioned to receive X-rays from said source after passage thereof through the corresponding article, said screens being of a material which converts incident X-radiation into light of a proportional intensity, a photoelectric device having an output circuit associated therewith, said output circuit including means providing a supply voltage, the magnitude of which determines the magnitude of output voltage in said output circuit for a given light on said photoelectric device, means operated in phase with said light-directing means for comparing the output voltage with a standard voltage during an interval when the output voltage results substantially from light from a preselected one of said articles, and means responsive to said comparing means for varying the magnitude of said supply voltage, means for directing light from said screens onto said photoelectric device periodically so that said screens begin to illuminate said photoelectric device, an amplifier connected to said output circuit to amplify an alternating current therein resulting from unequal light from said screens, an algebraic rectifier operated in phase with said light-directing means and connected to said amplifier to convert the output thereof to a direct current of a polarity determined by which of the screens provides the greater light, the magnitude of said direct current being a measure of the difference of said lights, and a polarized current responsive device connected to said rectifier to be energized by said direct current.

WILLIAM ALTAR.
OTTO J. M. SMITH.

REFERENCES CITED

The following references are of record in the file of this patent:

UNITED STATES PATENTS

| Number | Name | Date |
| --- | --- | --- |
| 1,806,197 | Hardy et al. | May 19, 1931 |
| 2,076,553 | Drinker et al. | Apr. 13, 1937 |
| 2,198,233 | Snyder | Apr. 23, 1940 |
| 2,225,439 | Arens et al. | Dec. 17, 1940 |
| 2,382,251 | Parket et al. | Aug. 14, 1945 |
| 2,457,747 | Sweet | Dec. 28, 1948 |
| 2,469,206 | Rich | May 3, 1949 |
| 2,467,844 | Michel | Apr. 19, 1949 |

OTHER REFERENCES

Smith: General Elec. Review, March 1945, pages 13–17.

Michel and Rich: General Elec. Review, February 1947, pages 45–48.

Moriarty: General Elec. Review, February 1947, pages 39–42.